(12) United States Patent
Wei

(10) Patent No.: US 8,903,461 B2
(45) Date of Patent: Dec. 2, 2014

(54) HANDHELD ELECTRONIC DEVICE

(75) Inventor: Chih-Sheng Wei, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 492 days.

(21) Appl. No.: 12/686,363

(22) Filed: Jan. 12, 2010

(65) Prior Publication Data

US 2011/0053662 A1 Mar. 3, 2011

(30) Foreign Application Priority Data

Aug. 26, 2009 (TW) ................................ 98128715 A

(51) Int. Cl.
*H04Q 7/00* (2006.01)
*H04M 1/02* (2006.01)

(52) U.S. Cl.
CPC .......... *H04M 1/0237* (2013.01); *H04M 1/0216* (2013.01)
USPC .................. 455/575.1; 455/575.3; 455/575.4; 455/576; 379/13; 379/433.12; 379/433.13

(58) Field of Classification Search
CPC  H04M 1/0243; H04M 1/0227; H04M 1/0245
USPC .......... 455/575.1, 575.3, 575.4, 566; 379/13, 379/433, 433.02, 433.12, 433.13
See application file for complete search history.

(56) References Cited

U.S. PATENT DOCUMENTS

| 8,029,309 B2 * | 10/2011 | Ou et al. .................. 439/374 |
| 2007/0197270 A1 | 8/2007 | Kim |
| 2008/0307607 A1 * | 12/2008 | Kim et al. .................. 16/330 |
| 2010/0142132 A1 * | 6/2010 | Kilpi et al. ............... 361/679.01 |

FOREIGN PATENT DOCUMENTS

| EP | 1796351 | 6/2007 |
| EP | 2120426 | 11/2009 |
| EP | 2136538 | 12/2009 |
| KR | 100778530 | 11/2007 |

OTHER PUBLICATIONS

"Search Report of Europe Counterpart Application" issued on May 7, 2010, p. 1-p. 3.
"Office Action of Europe Counterpart Application" issued on May 28, 2010, p. 1-p. 8.

* cited by examiner

*Primary Examiner* — Ajit Patel
*Assistant Examiner* — Julio Perez
(74) *Attorney, Agent, or Firm* — Jianq Chyun IP Office

(57) ABSTRACT

A handheld electronic device including a first body, a second body and a transmission mechanism is provided. The second body is stacked with the first body. The second body has a recess at a side facing the first body. The transmission mechanism includes a first plate, a second plate and a rotating member. The first plate is fixed on the first body. The second plate is slidingly coupled to the first plate. An end of the rotating member is pivoted on the second body, and another end of the rotating member is pivoted on the second plate. When the first body slides with respect to the second body toward the recess, the rotating member rotates and drives the first body enters the recess.

7 Claims, 5 Drawing Sheets

HANDHELD ELECTRONIC DEVICE

CROSS-REFERENCE TO RELATED APPLICATION

This application claims the priority benefit of Taiwan application serial No. 98128715, filed on Aug. 26, 2009. The entirety of the above-mentioned patent application is hereby incorporated by reference herein and made a part of this specification.

BACKGROUND OF THE INVENTION

1. Field of the Invention

The present application relates to an electronic apparatus. More particularly, the present application relates to a handheld electronic apparatus.

2. Description of Related Art

Along with development of information technology, obtaining required information from an electronic device becomes easier. On the other hand, with development of industrial engineering, various electronic devices have a general trend of lightness, slimness, shortness and smallness, and since the electronic devices have a feature and advantage of portability, they are widely used in people's daily life.

Taking mobile phones as an example, to meet a requirement of portability and different preferences and demands, besides a conventional bar-type mobile phone, the mobile phones further include clamshell-type mobile phones, swivel-type mobile phones, and sliding-type mobile phones, etc. Taking the sliding-type mobile phone as an example, an upper body thereof is stacked over and can be slid relatively to a lower body thereof, so as to present different operation modes of open and close. Stacking the two bodies avails reducing a whole size of the mobile phone, and the two bodies can be spread during an expanding mode.

Taking a two-layer sliding-type phone having a keyboard as an example, an operation method thereof is as follows. A display screen of the sliding-type phone can be slid to a side of the keyboard to expose the keyboard, so as to facilitate a user to perform input. However, in case of such design, after the display screen is slid relatively to the keyboard, a height difference is formed there between to present a step profile, so that an appearance of the sliding-type phone is lack of integrity. Moreover, after the display screen is slid relatively to the keyboard, a sliding groove is generally exposed to influence the appearance of the slide phone.

SUMMARY OF THE INVENTION

The application provides a handheld electronic device having an integral and concise appearance.

The application provides a handheld electronic device including a first body, a second body and a transmission mechanism. The second body is stacked with the first body, and the second body has a recess at a side facing the first body. The transmission mechanism includes a first plate, a second plate and a rotating member. The first plate is fixed on the first body. The second plate is slidingly coupled to the first plate. An end of the rotating member is pivoted on the second body, and another end of the rotating member is pivoted on the second plate. When the first body slides with respect to the second body toward the recess, the rotating member rotates and drives the first body enters the recess.

Accordingly, the first body enters the recess after sliding with respect to the second body toward the recess so that the first body and the second body are substantially coplanar to maintain integrity of the appearance of the handheld electronic device. Therefore, the integrality of appearance of the handheld electronic device is improved. Furthermore, relative sliding between the first body and the second body is driven by the first plate and the second plate, so that configuring of a sliding groove on the first body or the second body is unnecessary, and therefore the appearance of the handheld electronic device is concise.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
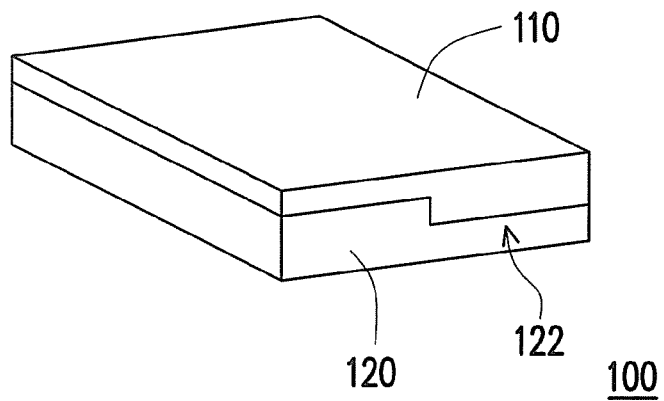
FIG. 1 is a schematic view of a handheld electronic device according to one embodiment of the invention.
Figure 2:
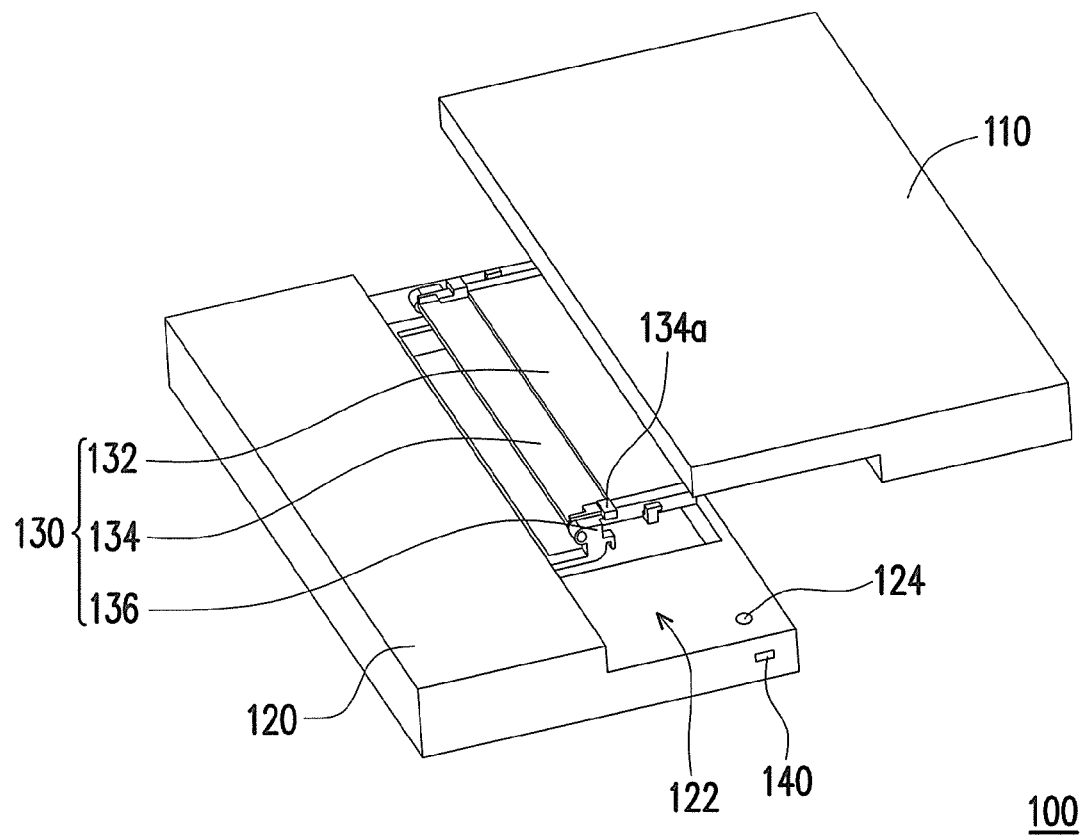
FIG. 2 is an explosive view of the handheld electronic device of FIG. 1.

FIG. 1 is a schematic view of a handheld electronic device according to one embodiment of the invention. FIG. 2 is an explosive view of the handheld electronic device of FIG. 1. Referring to FIG. 1 and FIG. 2, the handheld electronic device 100 includes a first body 110, a second body 120 and a transmission mechanism 130. The second body 120 is stacked with the first body 110, and the second body 120 has a recess 122 at a side facing the first body 110. In the embodiment, the first body 110 and the second body 120 are respectively provided with a display screen and a keyboard of the handheld electronic device 100. However, in another embodiment, the second body 120 maybe an additional display screen.

Figure 3:
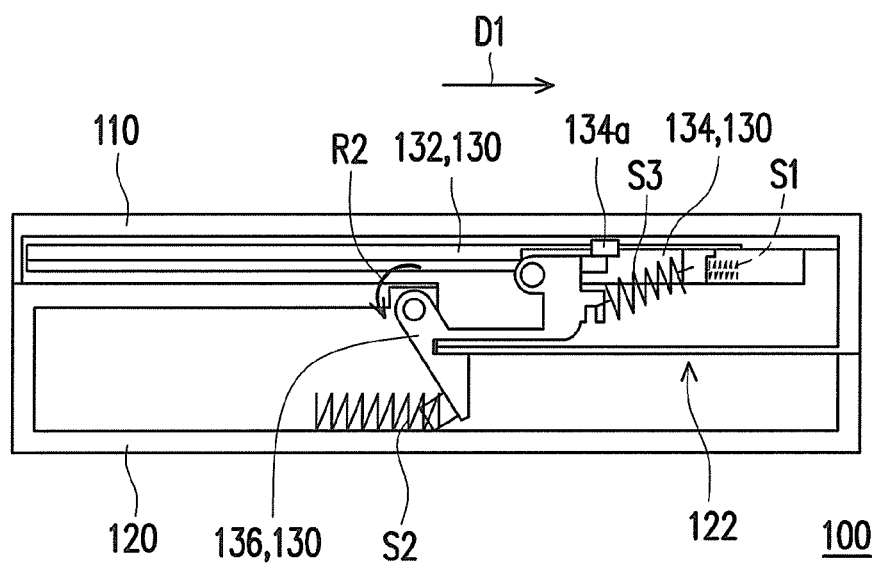
FIG. 3 is a partially side view of the handheld electronic device of FIG. 1.

FIG. 3 is a partially side view of the handheld electronic device of FIG. 1. Referring to FIGS. 2 and 3, more specifically, the transmission mechanism 130 includes a first plate 132, a second plate 134 and a rotating member 136. The first plate 132 is fixed on the first body 110. The second plate 134 is slidingly coupled to the first plate 132. An end of the rotating member 136 is pivoted on the second body 120, and another end of the rotating member 136 is pivoted on the second plate 134.

Thereby, when the first plate 132 slides with respect to the second plate 134 and drives the first body 110 shifting toward the recess 122 of the second body 120, the rotating member 136 rotates and drives the first body 110 enters the recess 122 to make a top surface of the first body 110 being substantially coplanar with a top surface of the second body 120.

An operation process of the handheld electronic device 100 is specifically illustrated below.

Figure 4A:
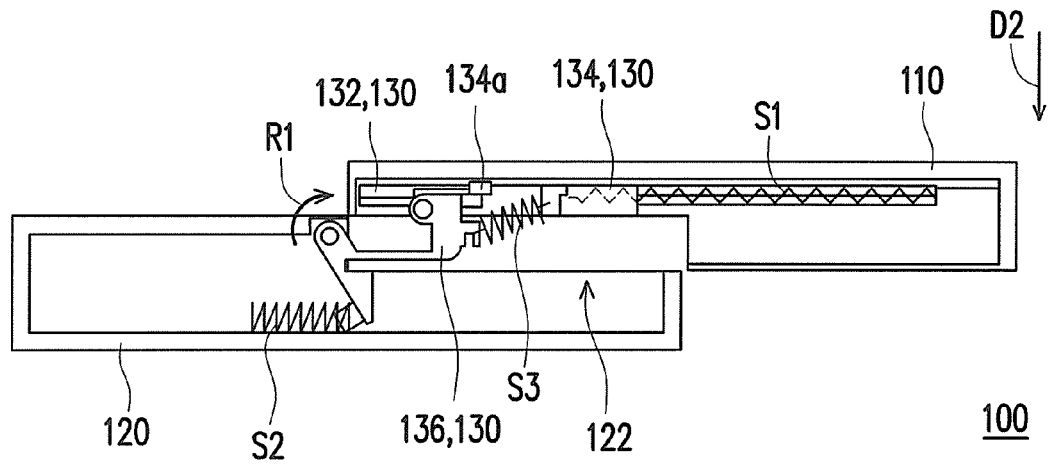
FIGS. 4A and 4B schematically show operation process of the handheld electronic device of FIG. 1.
Figure 4B:
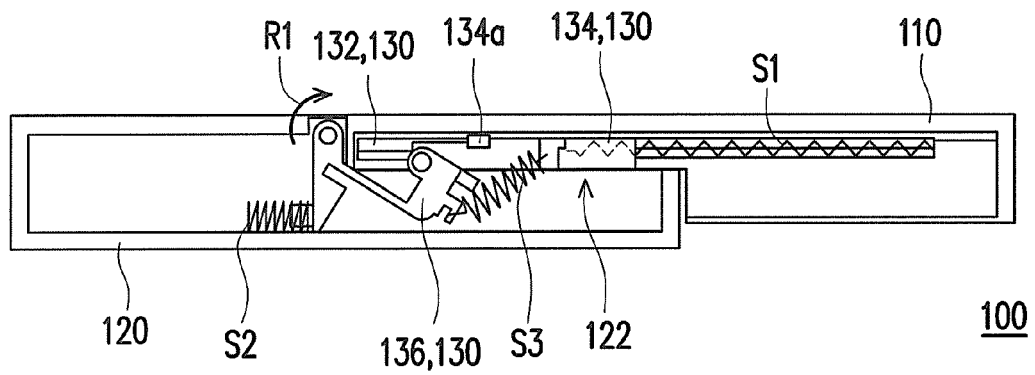

FIGS. 4A and 4B schematically show operation process of the handheld electronic device of FIG. 1. Referring to FIG. 3, when a user needs to operate the handheld electronic device 100 with a keyboard, the first body 110 is driven to the position along direction D1 as shown in FIG. 4 to expose the keyboard on the second body 120. In the process, the first body 110 shifts with respect to the second body 120 through the sliding movement between the first plate 132 and the second plate 134. Then, referring to FIG. 4A, the first body 110 is pressed downward to the position as shown in FIG. 4B along direction D2, and thereby the first body 110 enters the recess 122 of the second body 120 and is located therein. In the process, the first body 110 is driven to the recess 122 through the rotation of the rotating member 136 along direction R1. When the operation ends up, restriction to the first body 110 can be released and the first body 110 returns to the position as shown in FIG. 3, to retract the handheld electronic device 100.

Referring to FIG. 3, the transmission mechanism 130 of the embodiment further includes a first elastic member S1, a second elastic member S2, and a third elastic member S3. The first elastic member Si is connected between the first plate 132 and the second plate 134. When the first plate 132 slides with respect to the second plate 134 and drives the first body 110 shifting toward the recess 122 of the second body 120, the first elastic member S1 deforms and stores an elastic potential. The first elastic member S1 may be a helical spring. In the process that the first body 110 shifts from the position of FIG. 3 to the position of FIG. 4A, the first elastic member S1 extends and stores an elastic potential to draw back the first body 110 in the retraction of the handheld electronic device 100.

The second elastic member S2 is connected between the rotating member 136 and the second body 120. The second elastic member S2 deforms and stores an elastic potential when the first body 110 enters the recess 122 through the rotation of the rotating member 136. The second elastic member S2 may be a helical spring. In the process that the first body 110 moves downward from the position of FIG. 4A to the position of FIG. 4B, the second elastic member S2 is compressed and stores an elastic potential to draw back the first body 110 in the retraction of the handheld electronic device 100.

The third elastic member S3 is connected between the rotating member 136 and the second plate 134. When the first body 110 enters the recess 122 by the rotation of the rotating member 136, the third elastic member S3 deforms and stores an elastic potential. The third elastic member S3 may be a helical spring. In the process that the first body 110 moves downward from the position of FIG. 4A to the position of FIG. 4B, the third elastic member S3 extends and stores an elastic potential to draw back the first body 110 in the retraction of the handheld electronic device 100.

Furthermore, referring to FIG. 3, the second plate 134 has a stopper 134a used to restrict a stroke path of the rotating member 136 by a structural interference between the stopper 134a and the rotating member 136. Specifically, when the first body 110 is retracted with respect to the second body 120 as shown in FIG. 3, the rotating member 136 leans against the stopper 134a and is restricted from rotating along direction R2, to prevent the first body 110 leaving away from the second body 120 along direction R2.

Figure 5A:
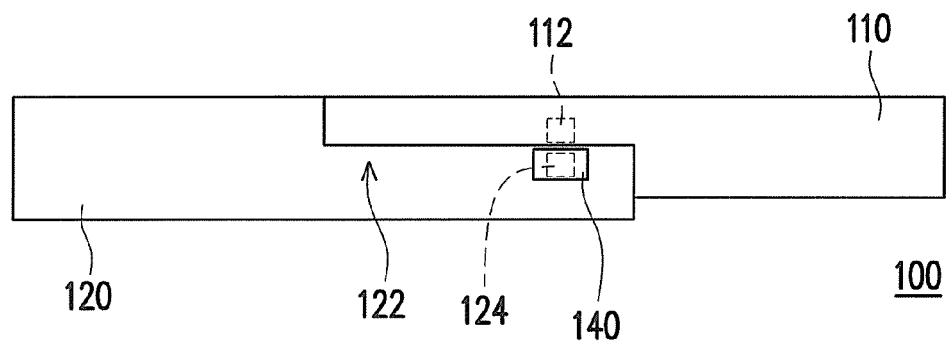
FIGS. 5A and 5B are side views showing an expanding mode of the handheld electronic device of FIG. 1.
Figure 5B:
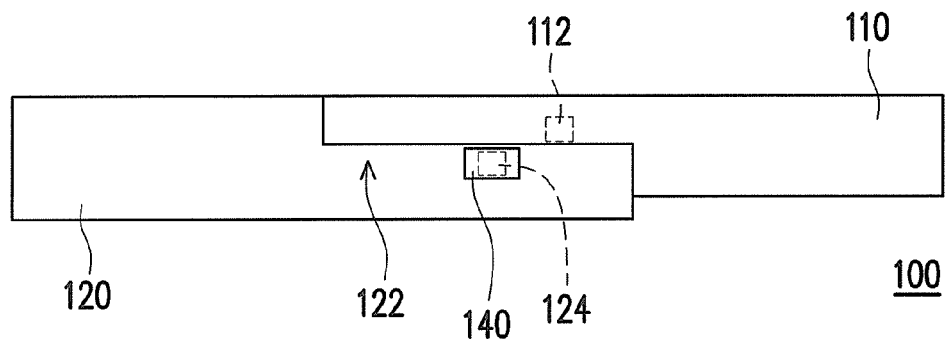

Manners of locating the first body 110 in the recess 122 and releasing the first body 110 to draw it back are illustrated in FIGS. 5A and 5B. FIGS. 5A and 5B are side views showing an expanding mode of the handheld electronic device of FIG. 1. Referring to FIG. 5A, in the embodiment, the first body 110 comprises a first member 112 and the second body 120 comprises a second member 124. When the first body 110 enters the recess 122, the first member 112 and the second member 124 are fixed to each other to locate the first body 110 in the recess 122, and thus the handheld electronic device 100 is kept in an expanding mode. The first member 112 and the second member 124 are magnetic members capable of inducing magnetic attractive force with respect to each other and are attracted together by the magnetic attraction force. For example, one of the first member 112 and the second member 124 is a permanent magnetic member, and another one is a soft magnetic member. Otherwise, the first member 112 and the second member 124 are permanent magnetic members configured with different polarities. In addition, the permanent magnetic member may be a magnet or an electromagnet, and the soft magnetic member may include iron, cobalt, nickel, or combinations thereof. However, the application is not limited thereto. In other embodiments, the first member 112 and the second member 124 can further configured as two mated fasteners capable of being engaged with each other by structural interference.

Moreover, the handheld electronic device 100 may further include an unlock switch 140 to release the engagement to the first body 110. In this embodiment, the unlock switch 140 is disposed on the second body 120 and connected to the second member 124. The engagement between the first member 112 and the second member 124 is released by pushing the unlock switch 140 to drive the second member 124 shifting from the position as shown in FIG. 5A to the position as shown in FIG. 5B. However, the application provides no limitation on the position of the unlock switch 140. In other embodiments, the unlock switch 140 may further be disposed on the first body 110 and connected to the first member 112 to drive the first member 112 shifting away from the second member 124.

Referring to FIG. 5, when the handheld electronic device 100 is retracted, the unlock switch 140 is pushed to drive the second member 124 shifting away from the first member 112 and moving to the position as shown in FIG. 5B. Therefore, the magnetic attractive force applied between the first member 112 and the second member 124 is removed, and the first member 112 and the second member 124 are no more engaged with each other. At this time, the elastic potential stored by the second elastic member S2 and the third elastic member S3 is released, by which the first body 110 can be raised to the position as shown in FIG. 4A. Then, the elastic potential stored by the first elastic member S1 is also released to driven the first body 110 shifting to the position as shown in FIG. 3 and retracted with the second body 120.

Figure 6A:
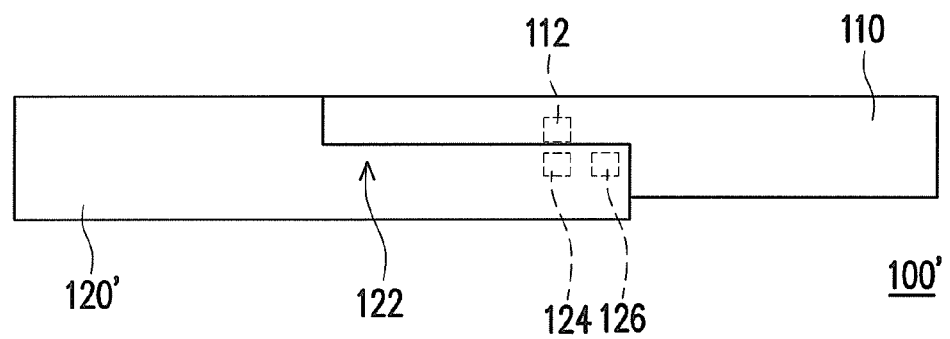
FIGS. 6A and 6B are side views showing an expanding mode of a handheld electronic device according to another embodiment of the invention.
Figure 6B:
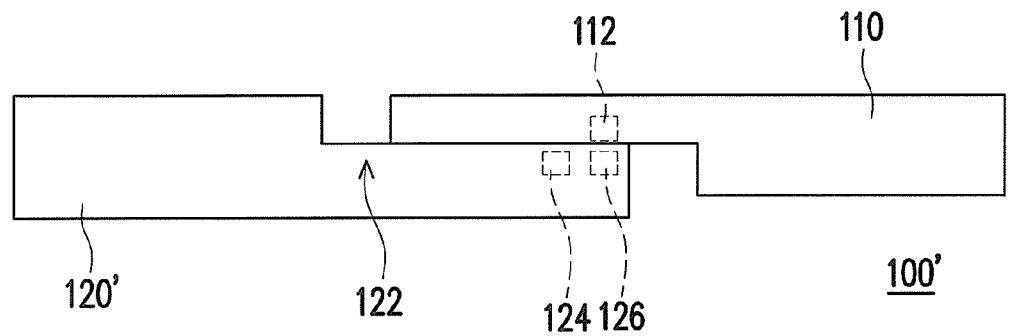

In addition to the manner of drawing the first body 110 back through the elastic potential stored by the first elastic member S1, the second elastic member S2, and the third elastic member S3 in the retraction process of the handheld electronic device 100, another manner drawing the first body 110 back by magnetic force of magnetic element is further proposed in the following embodiment illustrated in FIGS. 6A and 6B. FIGS. 6A and 6B are side views showing an expanding mode of a handheld electronic device according to another embodiment of the invention. Referring to FIG. 6A, compared to the handheld electronic device 100 of FIG. 5A, the second body 120' of the handheld electronic device 100' of this embodiment further includes a third member 126. The first member 112 and the third member 126 are magnetic members capable of inducing magnetic repulsive force with respect to each other. For example, the first member 112 and the third member 126 are magnets or electromagnets configured with identical polarity. When the first body 110 slides with respect to the second body 120' and moves to the position as shown in FIG. 6B, the first body 110 is repulsed away from the recess 122 by the magnetic repulsive force between the first member 112 and the third member 126. In other words, the magnetic repulsive force between the first member 112 and the third member 126 can functions together with the elastic potential of the second elastic member S2 and the third elastic member S3 as shown in FIG. 4B, to drive the first body 110 away from the recess 122. However, in other embodiments of the present application, handheld electronic devices can be provided without magnetic elements or unlock switch. In other words, the first body 110 as shown in FIG. 4B can be drawn back manually.

In summary, the first body enters the recess after sliding with respect to the second body toward the recess, and thereby the top surface of the first body can be keep substantially coplanar with the top surface of the second body. Therefore, integrity of an appearance of the handheld electronic device is maintained. Furthermore, Relative sliding between the first body and the second body is driven by the first plate and the second plate, so that configuring of a sliding groove on the first body or the second body is unnecessary, and therefore the appearance of the handheld electronic device is more concise. In addition, the first body can be located in the recess of the second body through magnetic elements or fasteners to keep the handheld electronic device in the expanding mode. Elastic potential stored by the elastic members can be utilized to draw the first body back and retract the first body and the second body, to improve the convenience of operating the handheld electronic device.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A handheld electronic device, comprising:
   a first body;
   a second body, wherein the first body is stacked on a carrying surface of the second body, and the second body has a recess on the carrying surface;
   a transmission mechanism, comprising:
      a first plate, fixed on the first body;
      a second plate, slidingly coupled to the first plate;
      a rotating member, provided with an end pivoted on the second body and another end pivoted on the second plate, wherein the first body is configured to move in relative to the second body along a first direction parallel with the carrying surface, and then the rotating member is configured to drive an end of the first body entering the recess of the second body to form an extended configuration;
      a first elastic member, connected between the first plate and the second plate, wherein the first elastic member is configured to be deformed and storing an elastic potential as the first body moving in relative to the second body; and
      a second elastic member, connected between the rotating member and the second body, wherein the second elastic member is configured to deform and to store an elastic potential when the end of the first body enters the recess by the rotation of the rotating member;
   a first magnetic member, disposed on the first body;
   a second magnetic member, disposed adjacent to an end of the portion of the second body and configured to induce magnetic attractive force with respect to the first magnetic member for holding the first body and the second body in the extended configuration; and
   a third magnetic member, disposed between the second magnetic member and the end of the portion of the second body, wherein an overextended configuration is formed by moving the first body a further distance away from the second body along the first direction from the extended configuration, the third magnetic member is configured to induce a magnetic repulsive force with respect to the first magnetic member when the handheld electronic device is in the configuration, and the elastic potential stored in the first elastic member is configured to be released in the overextended configuration to drive the first body moving in relative to the second body along a second direction in opposite to the first direction, to form a retracted configuration.

2. The handheld electronic device of claim 1, wherein the first body and the second body are configured such that, after the end of the first body enters the recess, a top surface of the first body is coplanar with a top surface of the second body.

3. The handheld electronic device of claim 1, wherein the first elastic member is a helical spring.

4. The handheld electronic device of claim 1, wherein the second elastic member is a helical spring.

5. The handheld electronic device of claim 1, wherein the transmission mechanism further comprises:
   a third elastic member, connected between the rotating member and the second plate, wherein the third elastic member is configured to deform and to store an elastic potential when the end of the first body enters the recess by the rotation of the rotating member.

6. The handheld electronic device of claim 5, wherein the third elastic member is a helical spring.

7. The handheld electronic device of claim 1, wherein the second plate has a stopper restricting a stroke path of the rotating member by a structural interference between the stopper and the rotating member.

* * * * *